United States Patent
Kanafani et al.

(10) Patent No.: US 7,097,587 B2
(45) Date of Patent: Aug. 29, 2006

(54) RATIO SELECTION METHOD FOR A CONTINUOUSLY VARIABLE TRANSMISSION

(75) Inventors: Fadi S Kanafani, Rochester, MI (US); Mark J Duty, Goodrich, MI (US); Gregory L Ohl, Ann Arbor, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 230 days.

(21) Appl. No.: 10/916,893

(22) Filed: Aug. 12, 2004

(65) Prior Publication Data

US 2006/0035749 A1 Feb. 16, 2006

(51) Int. Cl.
F16H 61/662 (2006.01)
B60W 10/04 (2006.01)
G06F 7/00 (2006.01)

(52) U.S. Cl. .................. 477/43; 477/110; 701/56
(58) Field of Classification Search .......... 477/43, 477/37, 46, 107, 110; 701/55, 56
See application file for complete search history.

(56) References Cited

U.S. PATENT DOCUMENTS

| | | | | |
|---|---|---|---|---|
| 4,459,878 A | * | 7/1984 | Frank | 477/39 |
| 4,658,360 A | * | 4/1987 | Osanai et al. | 701/62 |
| 4,796,489 A | * | 1/1989 | Nagamatsu et al. | 477/46 |
| 5,948,034 A | * | 9/1999 | Tihanyi et al. | 701/64 |
| 6,019,701 A | * | 2/2000 | Mori et al. | 477/46 |
| 6,547,691 B1 | | 4/2003 | Hino | |
| 6,560,522 B1 | * | 5/2003 | Katakura et al. | 701/54 |
| 6,718,247 B1 | * | 4/2004 | Graf et al. | 701/51 |
| 2001/0053731 A1 | * | 12/2001 | Ibamoto et al. | 477/46 |

* cited by examiner

*Primary Examiner*—Roger Pang
(74) *Attorney, Agent, or Firm*—Thomas A. Jurecko

(57) ABSTRACT

A gear ratio selection method for a transmission in a motor vehicle includes detecting a power request, detecting a vehicle speed of the motor vehicle, and providing an engine speed of the motor vehicle. A first desired engine speed is calculated from a first variogram using the power request and the vehicle speed. A second desired engine speed is calculated from a second variogram using the power request and the vehicle speed. A blend factor is determined from the power request, the vehicle speed, and the engine speed. Finally, a blended desired engine speed is calculated from the first desired engine speed, the second desired engine speed, and the blend factor. The blended desired engine speed is used to determine a gear ratio for the continuously variable transmission.

7 Claims, 3 Drawing Sheets

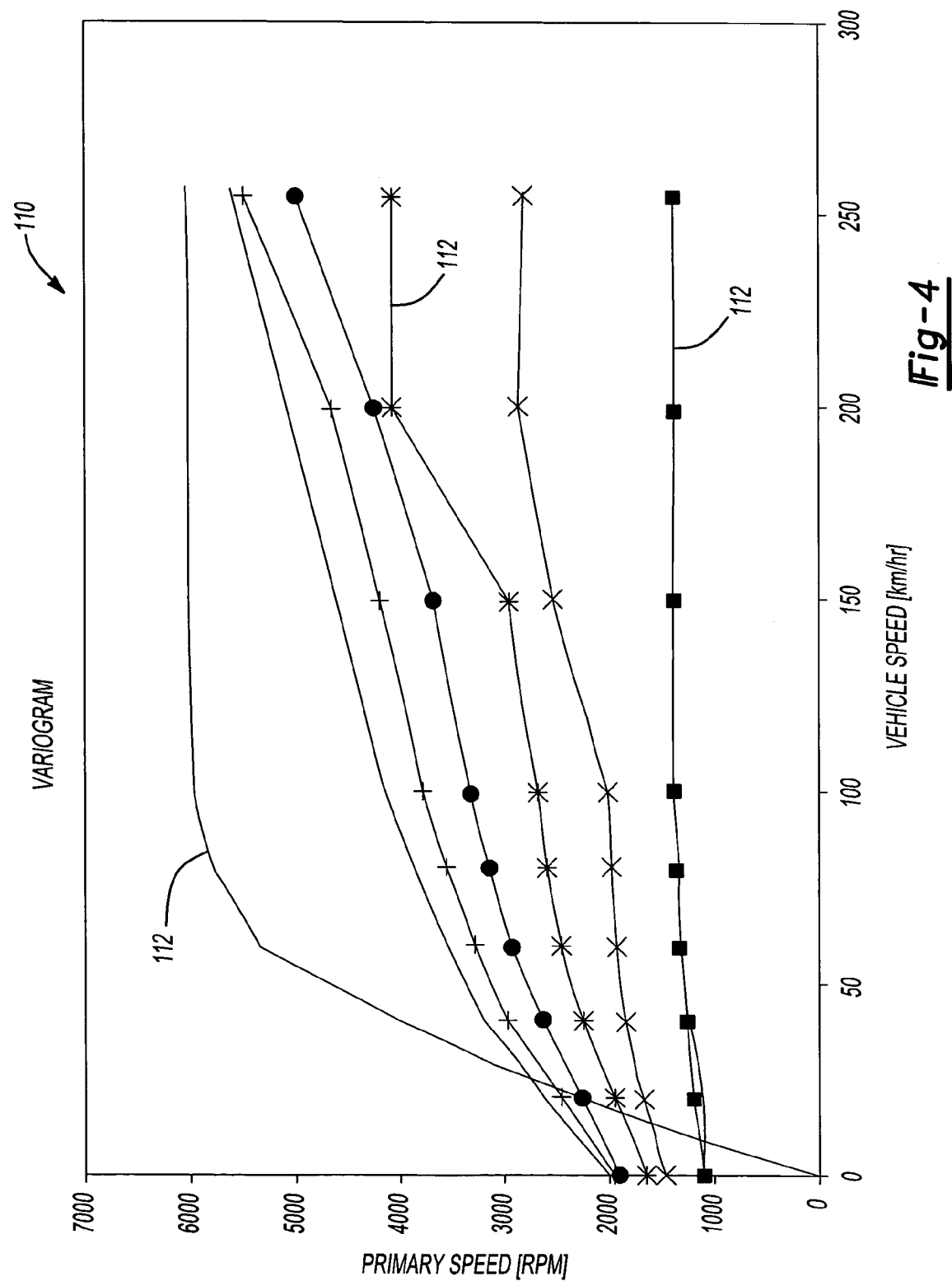

RATIO SELECTION METHOD FOR A CONTINUOUSLY VARIABLE TRANSMISSION

FIELD OF THE INVENTION

The present invention relates to continuously variable transmissions, and more particularly to a ratio selection method for a continuously variable transmission.

BACKGROUND OF THE INVENTION

Continuously variable transmissions are known in the art and generally include primary and secondary pulleys used to continuously vary the transmission ratio of engine speed to vehicle speed in a motor vehicle. Unlike automatic and manual transmissions, continuously variable transmissions have a different driving "feel" since they do not have discrete gear selections.

One method for controlling the continuously variable transmission ratio (i.e., gear ratio) is to use predefined variograms. These variograms relate vehicle speed to requested power to determine an engine speed. This engine speed, along with the known vehicle speed, is used to calculate a gear ratio for the continuously variable transmission. However, a given variogram is different from another variogram and some variograms are tailored to economical fuel efficient driving, while others are tailored to sporty performance driving. A past solution to this has been to include two different switchable driving modes each corresponding to a different variogram. For example, providing a sports drive mode and an economy drive mode, selectable by an operator of the motor vehicle. This, however, forces the driver to manually select between the two variograms and does not allow for gear selection in between.

SUMMARY OF THE INVENTION

A gear ratio selection method for a transmission in a motor vehicle includes determining a vehicle operator's power request, determining a vehicle speed of the motor vehicle, and determining an engine speed of the motor vehicle. A plurality of variograms relating vehicle speed to requested powers are provided for determining engine speed. First and second ones of the plurality of variograms are selected, and a first desired engine speed is calculated from the first variogram using the power request and the vehicle speed. A second desired engine speed is calculated from the second variogram using the power request and the vehicle speed. A blend factor is determined from the power request, the vehicle speed, and the engine speed to reflect a ratio of the vehicle operator's desired performance reflected by the first desired engine speed versus performance reflected by the second desired engine speed. Finally, a blended desired engine speed is calculated from the first desired engine speed, the second desired engine speed, and the blend factor. The blended desired engine speed is used to calculate a gear ratio for the continuously variable transmission.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is an exemplary variogram used in the ratio map selection of FIG. 3.

DETAILED DESCRIPTION OF THE PREFERRED EMBODIMENTS

The following description of the preferred embodiment(s) is merely exemplary in nature and is in no way intended to limit the invention, its application, or uses.

Figure 1:
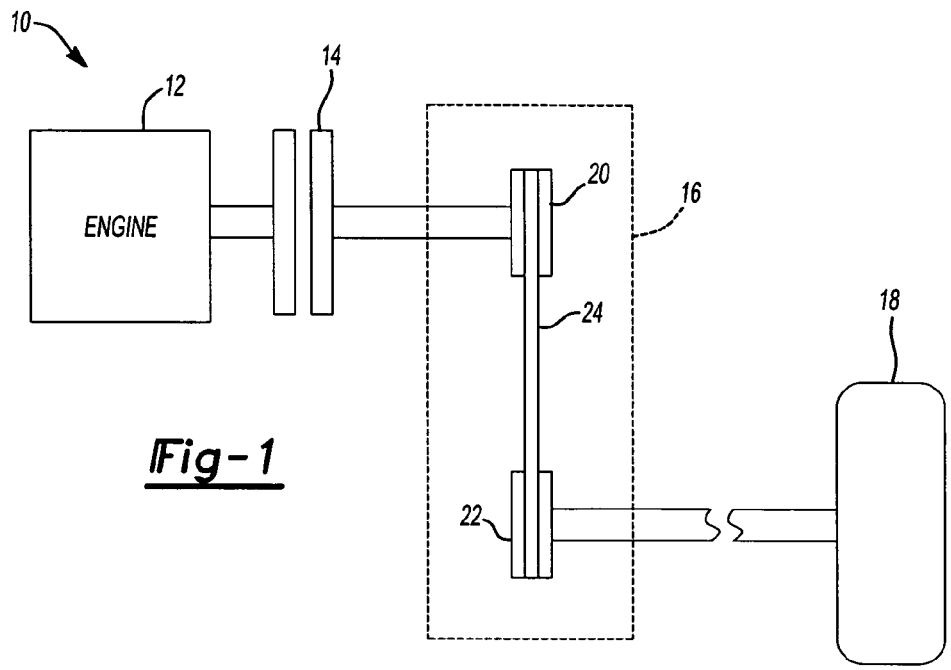
FIG. 1 is a schematic view of a power train having a continuously variable transmission for use with the ratio selection method of the present invention.
Figure 2:
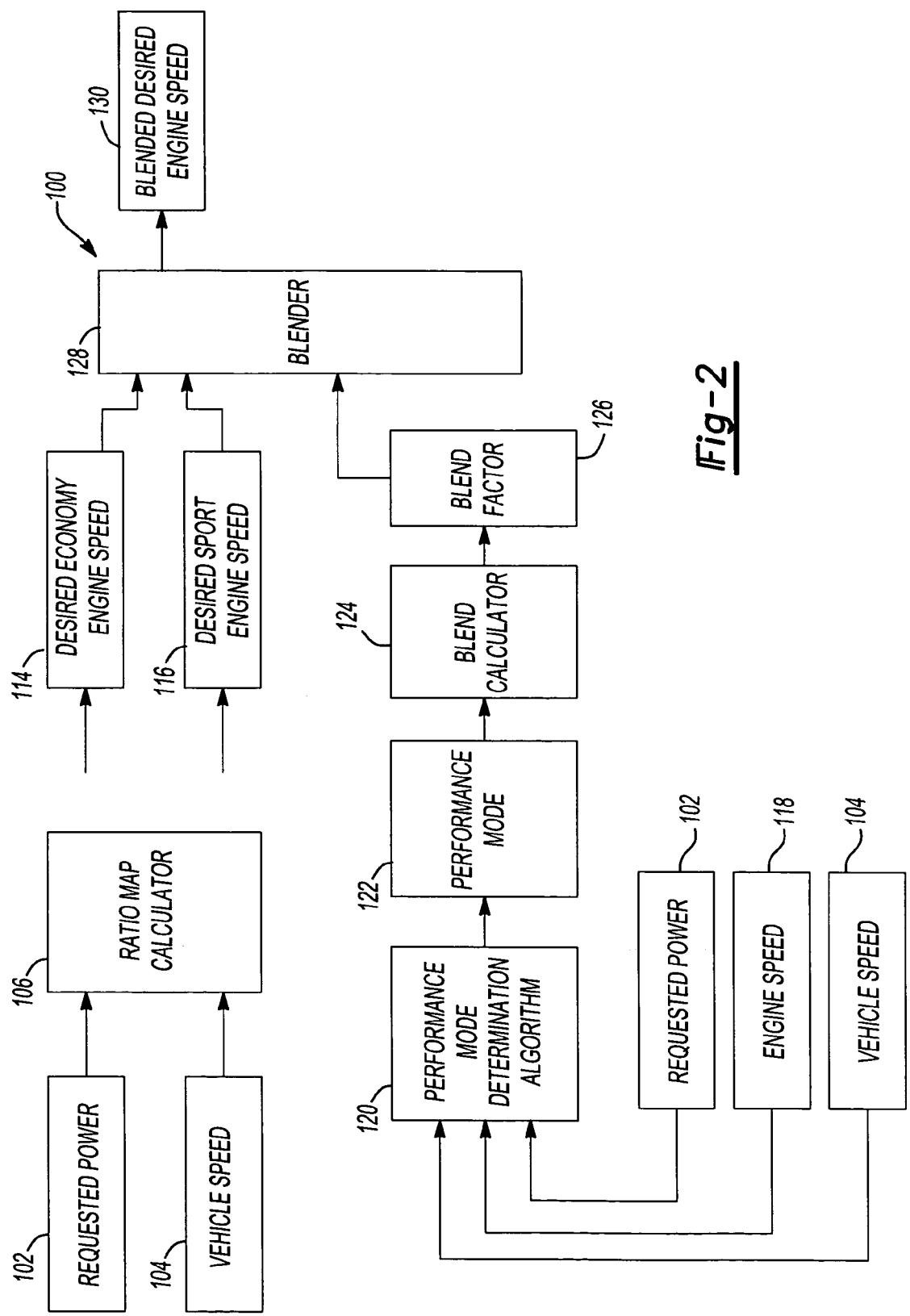
FIG. 2 is a block diagram of the ratio selection method of the present invention.

With reference to FIG. 1, an exemplary powertrain 10 used with the ratio selection method, generally indicated by reference numeral 100 in FIG. 2, is shown. The powertrain 10 generally includes an engine 12 coupled to a torque converter 14. The torque converter 14 is in turn coupled to a continuously variable transmission (CVT) 16. The CVT 16 is in turn connected through a differential (not shown) to the wheels 18 of a motor vehicle (not shown). It will be appreciated that the ratio selection method of the present invention may be used with alternate powertrain designs incorporating a CVT, or alternatively with powertrain designs using a conventional automatic transmission.

The CVT 16 generally includes a primary pulley 20 coupled to a secondary pulley 22 via a belt 24. The primary pulley 20 is driven by the engine 12 through the torque converter 14. When the torque converter 14 is fully locked, the engine speed is approximately equal to the primary pulley 20 speed. Accordingly, the gear selection method 100 uses the value of the engine speed in place of the primary pulley speed hereinafter. The primary pulley 20 drives the belt 24 which in turn drives the secondary pulley 22. The secondary pulley 22 is coupled to the wheels 18 through the differential (not shown). The vehicle speed is in turn approximately a direct function of the secondary pulley 22 speed, based upon the gear ratio through the differential or any final drive gear (not shown). Accordingly, the ratio selection method 100 uses the vehicle speed in place of the secondary pulley speed hereinafter. The continuously variable transmission 16 provides a gear ratio. The ratio selection method 100, as will be described below, is used to determine this gear ratio to be provided by the CVT 16.

Turning now to FIG. 2, the ratio selection method 100 will be discussed in detail. The ratio selection method 100 is used to determine a gear ratio for the CVT 16 during acceleration. During acceleration, the driver of the motor vehicle depresses the accelerator (not shown) to request a power from the motor vehicle. This requested power, indicated by reference numeral 102, is typically determined by a voltage sensor that determines the position of the pedal (not shown). The requested power 102, along with the current vehicle speed 104, is fed into a ratio map calculator 106.

Figure 3:
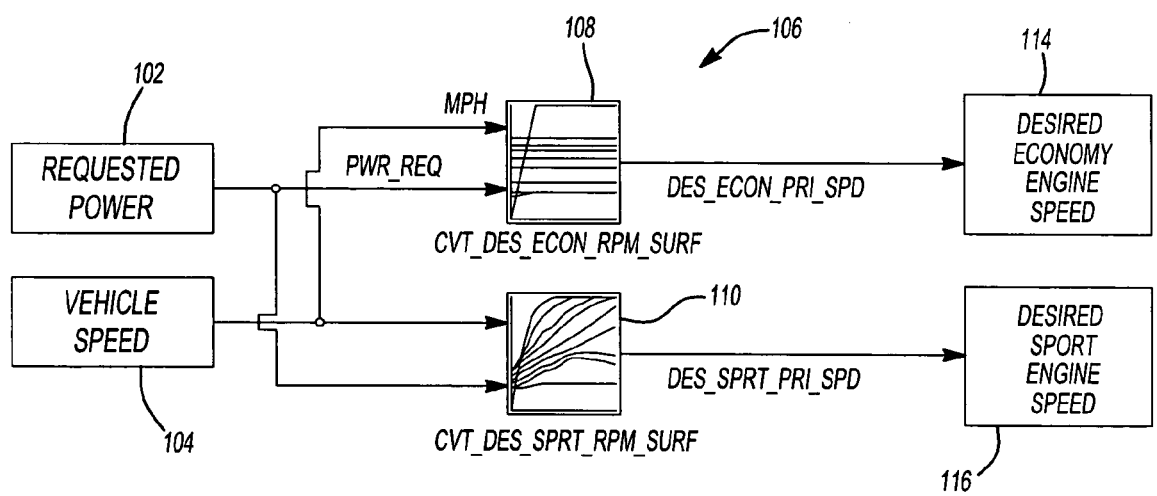
FIG. 3 is a block diagram of a ratio map calculator used with the ratio selection method of the present invention.

With reference to FIG. 3, the ratio map calculator 106 is used to determine a desired economy engine speed and a desired sport engine speed. In the particular example provided, the requested power 102 and the current vehicle speed 104 are each fed into an economy variogram 108 and a sport variogram 110. The economy variogram 108 is a ratio map calibrated to provide an optimal fuel economy. The sport variogram 110 is in turn calibrated to provide the best performance feel. As a result, a desired economy engine speed 114 and a desired sport engine speed 116 are determined.

Turning briefly to FIG. 4, an exemplary variogram is provided. The variogram is a graph of vehicle speed versus engine speed. Power request lines, indicated by reference numeral 112, are mapped onto the graph and are specific to the type of variogram being used. For example, in the example provided, the power request lines for the variogram have varying slopes ranging from fairly horizontal to fairly vertical. Alternatively, an economy variogram would have fairly straight horizontal power request lines.

With the requested power 102 and vehicle speed 104 input, a desired engine speed may be determined. Specifically, the vehicle speed 104 is mapped against a power request line 112 corresponding to the requested power 102. This corresponds to a point within the variogram 110. This point, in turn, corresponds to a desired engine speed located on the Y axis of the variogram.

Turning back to FIG. 3, the requested power 102 and vehicle speed 104 are used, as described above, with the economy variogram 108 to determine a desired economy engine speed 114. Likewise, the requested power 102 and the vehicle speed 104 are used with the sport variogram 110 to determine a desired sport engine speed 116.

Returning to FIG. 2, the requested power 102, the vehicle speed 104, and the current engine speed 118 of the vehicle are inputted into a performance mode determination algorithm 120. The performance mode determination algorithm 120 uses the rates of the change of the position of the accelerator pedal (not shown) to determine whether the driver of the motor vehicle wishes to be in an economy mode of driving, a sports mode of driving, or any mode therebetween (e.g., a high rate of change indicates a desire for performance mode, while a slow rate of change indicates a desire for an economy performance mode). Accordingly, the performance mode determination algorithm 120 outputs a performance mode 122. The performance mode 122 is a weighted value corresponding to the preferred driving mode of the driver of the motor vehicle, and may range from an economy mode to a sports mode (e.g., the performance mode 122 represents the driver's desired mode of driving). The performance mode 122 is then inputted into a blend calculator 124. The blend calculator 124 converts the performance mode 122 into a blend number 126. The blend number 126 is a value between 0 and 1 used to determine the blend between economy driving and performance driving.

The desired economy engine speed 114, the desired sport engine speed 116 and the blend factor 126 are then inputted into the blender 128. The blender 128 uses the blend factor 126 to blend the desired economy engine speed 114 with the desired sport engine speed 116. Preferably, the blend factor 126 is multiplied against the desired sport engine speed 116 and the desired economy engine speed 114 is multiplied against (1−the blend factor 126). These outcomes are then added together to determine a blended desired engine speed 130. The blended desired engine speed 130 with the vehicle speed 104 may be used to calculate a CVT gear selection ratio.

Alternatively, a set of more than two variograms may be employed, each set having a blended value between adjacent pairs of variograms. For example, if four variograms are employed, the blend factor 126 is the output of a look-up table where the maximum value of the blend factor 126 is "3" (i.e., the number of variograms−1). So, a blend factor 126 value of "0" indicates the first variogram, a blend factor 126 of "1" indicates the second variogram, a blend factor 126 of "2" indicates the third, and a blend factor of "3" indicates the fourth. In other words, if $0 \leq$ blend factor $\leq 1$, the blending occurs between variogram 1 and variogram 2 with the desired blended speed equal to ((1−blend factor) *variogram 1)+blend factor*variogram 2). If $1 \leq$ blend factor $\leq 2$, the blending occurs between the variogram 2 and variogram 3 with the desired blended engine speed equal to ((1−(blend factor−1)*variogram 2)+(blend factor−1)*variogram 3).

Using the above method, an infinite number of blends may be created between pairs of consecutive variograms. This allows for an unprecedented amount of customized "feel" for a continuously variable transmission.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A gear ratio selection method for a transmission in a motor vehicle comprising:
   determining a vehicle operator power request;
   detecting a vehicle speed of the motor vehicle;
   detecting an engine speed of the motor vehicle;
   providing a plurality of variograms relating vehicle speed to requested power for determining corresponding engine speed;
   selecting a first variogram and a second variogram from the plurality of variograms;
   calculating a first desired engine speed from the first variogram using the power request and the vehicle speed;
   calculating a second desired engine speed from the second variogram using the power request and the vehicle speed;
   determining a blend factor from the power request, the vehicle speed, and the engine speed wherein the blend factor represents a ratio of the vehicle operator's desire for performance reflected by the first desired engine speed versus performance reflected by the second desired engine speed;
   calculating a blended desired engine speed from the first desired engine speed, the second desired engine speed, and the blend factor; and
   using the blended desired engine speed to determine a gear ratio for the transmission.

2. The method of claim 1 wherein the first and second variogram are selected by accessing a look-up table based on the power request, vehicle speed and engine speed.

3. A gear ratio selection method for a transmission in a motor vehicle comprising:
   determining a vehicle operator power request;
   detecting a vehicle speed of the motor vehicle;
   detecting an engine speed of the motor vehicle;
   calculating a desired economy engine speed from an economy variogram using the power request and the vehicle speed;
   calculating a desired sport engine speed from a sport variogram using the power request and the vehicle speed;
   determining a blend factor from the power request, the vehicle speed, and the engine speed wherein the blend factor represents a ratio of the vehicle operator's desire for sport performance versus economy performance;

calculating a blended desired engine speed from the desired economy engine speed, the desired sport engine speed, and the blend factor; and using the blended desired engine speed to determine a gear ratio for the transmission.

4. The gear ratio selection method of claim 3, wherein the economy variogram includes a graph of engine speed versus power request tailored to provide optimized fuel economy.

5. The gear ratio selection method of claim 3, wherein the sport variogram includes a graph of engine speed versus power request tailored to provide optimized sport performance.

6. The gear ratio selection method of claim 3, wherein the blend factor is a number between 0 and 1 corresponding to the ratio of desired economy performance versus desired sport performance.

7. The gear ratio selection method of claim 3, wherein the transmission is a continuously variable transmission.

* * * * *